US011510281B2

(12) United States Patent
Yamashita

(10) Patent No.: US 11,510,281 B2
(45) Date of Patent: Nov. 22, 2022

(54) WIRELESS COMMUNICATIONS APPARATUS AND ELECTRONIC DEVICE

(71) Applicant: SHARP KABUSHIKI KAISHA, Sakai (JP)

(72) Inventor: Takafumi Yamashita, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/407,720

(22) Filed: Aug. 20, 2021

(65) Prior Publication Data

US 2022/0070973 A1    Mar. 3, 2022

(30) Foreign Application Priority Data

Aug. 28, 2020    (JP) .............................. JP2020-145026

(51) Int. Cl.
*H04W 88/06* (2009.01)
*H04B 1/40* (2015.01)

(52) U.S. Cl.
CPC .............. *H04W 88/06* (2013.01); *H04B 1/40* (2013.01)

(58) Field of Classification Search
CPC ........... H04B 1/04; H04B 1/40; H04W 88/02; H04W 8/06; H04W 88/08
See application file for complete search history.

(56) References Cited

U.S. PATENT DOCUMENTS

| 2009/0160784 | A1  | 6/2009  | Ishida |
|---|---|---|---|
| 2013/0072142 | A1  | 3/2013  | Akula et al. |
| 2019/0166505 | A1* | 5/2019  | Zhao ..................... H04W 16/18 |
| 2020/0343866 | A1* | 10/2020 | Deguchi ................. H04B 1/18 |
| 2020/0358501 | A1* | 11/2020 | Hormis ................. H04B 7/026 |
| 2022/0200578 | A1* | 6/2022  | Gruber ................. H04B 1/1607 |

FOREIGN PATENT DOCUMENTS

| CN | 109981157 A    | 7/2019 |
|---|---|---|
| JP | 2009-152705 A  | 7/2009 |
| JP | 2015213333 A   | 11/2015 |

* cited by examiner

*Primary Examiner* — Thanh C Le
(74) *Attorney, Agent, or Firm* — ScienBiziP, P.C.

(57) ABSTRACT

A wireless communications apparatus includes wireless circuits configured to transmit and receive signals. One of the wireless circuits is a first circuit for a fifth-generation mobile communications system. One of the wireless circuits that is different from the first circuit is a second circuit that is likely to be influenced by a transmission signal to be transmitted from the first circuit. The second circuit includes an attenuator configured to attenuate a reception signal received by the second circuit. The wireless communications apparatus includes a controller configured to (i) execute attenuation control to direct the transmission signal to pass through the attenuator if a predetermined signal condition is satisfied, and (ii) keep from executing the attenuation control if the predetermined signal condition is not satisfied, the predetermined signal condition being satisfied if the second circuit is highly likely to be influenced by the transmission signal received as the reception signal.

10 Claims, 8 Drawing Sheets

FIG.3

| TRANSMISSION LEVEL | TRANSMISSION FREQUENCY | DPDT CONTROL SIGNAL |
| --- | --- | --- |
| THRESHOLD OR BELOW | OUT OF PREDETERMINED RANGE | OFF |
| THRESHOLD OR BELOW | WITHIN PREDETERMINED RANGE | OFF |
| EXCEEDING THRESHOLD | OUT OF PREDETERMINED RANGE | OFF |
| EXCEEDING THRESHOLD | WITHIN PREDETERMINED RANGE | ON | ns
WIRELESS COMMUNICATIONS APPARATUS AND ELECTRONIC DEVICE

CROSS-REFERENCE TO RELATED APPLICATION

The present application claims priority from Japanese Patent Application No. 2020-145026, the content to which is hereby incorporated by reference into this application.

BACKGROUND OF THE INVENTION

1. Field of the Invention

An aspect of the present invention relates to, for example, a wireless communications apparatus including a plurality of wireless circuits for transmission and reception of signals.

2. Description of the Related Art

Conventional wireless communications apparatuses employ known techniques to control signal levels. Japanese Unexamined Patent Application Publication No. 2009-152705 discloses a technique to control signal levels to operate a device within a tolerance of a specific absorption rate (SAR). Japanese Unexamined Patent Application Publication No. 2015-213333 discloses a technique to control a level of a power detection signal to keep a transceiver from malfunction and a component from damage caused when transmitted power is coupled again to the transceiver.

SUMMARY OF THE INVENTION

When a wireless circuit of the fifth-generation mobile communications system (5G) is adopted to a wireless communications apparatus, a transmission signal transmitted from the wireless circuit is high in signal level. The high signal level is likely to influence another wireless circuit. Meanwhile, the applicant of the present invention has found out that the 5G wireless circuit is influenced by a transmission signal transmitted from the other wireless circuit. The influence here includes deterioration in reception characteristics, and breakdown of the receiver circuit.

The specification of Chinese Patent Application Publication No. 109981157 discloses a technique; that is, when two wireless communications techniques are simultaneously used and a transmission circuit of one of the wireless communications techniques transmits data, an attenuator of the other one of the wireless communications techniques reduces a level of a reception signal. However, the technique cited in the specification of Chinese Patent Application Publication No. 109981157 always reduces the level of the reception signal under the above condition. Hence, even though the technique could protect the receiver circuits from breakdown, the technique cannot prevent deterioration in reception characteristics of the receiver circuits.

In view of the above problem, an aspect of the present invention is intended to provide, for example, a wireless communications apparatus that protects wireless circuits while minimizing influence on the reception characteristics of the wireless circuits.

In order to solve the above problem, a wireless communications apparatus according to an aspect of the present invention includes a plurality of wireless circuits transmitting and receiving signals. At least one of the wireless circuits is a first circuit for a fifth-generation mobile communications system. At least one of the wireless circuits that is different from the first circuit is a second circuit that is likely to be influenced by a transmission signal to be transmitted from the first circuit. The second circuit includes an attenuator attenuating a reception signal received by the second circuit. The wireless communications apparatus includes a controller (i) executing attenuation control to direct the transmission signal to pass through the attenuator if a predetermined signal condition is satisfied, and (ii) keeping from executing the attenuation control if the predetermined signal condition is not satisfied, the predetermined signal condition being satisfied if the second circuit is highly likely to be influenced by the transmission signal received as the reception signal.

In order to solve the above problem, a wireless communications apparatus according to an aspect of the present invention includes a plurality of wireless circuits transmitting and receiving signals. At least one of the wireless circuits is a first circuit for a fifth-generation mobile communications system. At least one of the wireless circuits that is different from the first circuit is a second circuit configured to transmit a transmission signal that is likely to influence the first circuit. The first circuit includes an attenuator attenuating a reception signal received by the first circuit. The wireless communications apparatus includes a controller (i) executing attenuation control to direct the transmission signal to pass through the attenuator if a predetermined signal condition is satisfied, and (ii) keeping from executing the attenuation control if the predetermined signal condition is not satisfied, the predetermined signal condition being satisfied if the first circuit is highly likely to be influenced by the transmission signal received as the reception signal.

In order to solve the above problem, a method according to an aspect of the present invention is for controlling a wireless communications apparatus including a plurality of wireless circuits transmitting and receiving signals. At least one of the wireless circuits is a first circuit for a fifth-generation mobile communications system. At least one of the wireless circuits that is different from the first circuit is a second circuit that is likely to be influenced by a transmission signal to be transmitted from the first circuit. The second circuit includes an attenuator attenuating a reception signal received by the second circuit. The method includes: determining whether a predetermined signal condition is satisfied, the predetermined signal condition being satisfied if the second circuit is highly likely to be influenced by the transmission signal received as the reception signal; and executing attenuation control to direct the transmission signal to pass through the attenuator if the predetermined signal condition is satisfied. The attenuation control is not executed if the determining indicates that the predetermined signal condition is not satisfied.

In order to solve the above problem, a method according to an aspect of the present invention is for controlling a wireless communications apparatus including a plurality of wireless circuits transmitting and receiving signals. At least one of the wireless circuits is a first circuit for a fifth-generation mobile communications system. At least one of the wireless circuits that is different from the first circuit is a second circuit transmitting a transmission signal that is likely to influence the first circuit. The first circuit includes an attenuator attenuating a reception signal received by the first circuit. The method includes: determining whether a predetermined signal condition is satisfied, the predetermined signal condition being satisfied if the first circuit is highly likely to be influenced by the transmission signal received as the reception signal; and executing attenuation control to direct the transmission signal to pass through the attenuator if the predetermined signal condition is satisfied. The attenuation control is not executed if the determining indicates that predetermined signal condition is not satisfied.

An aspect of the present invention can provide, for example, a wireless communications apparatus protecting wireless circuits while minimizing influence on the reception characteristics of the wireless circuits.

BRIEF DESCRIPTION OF THE DRAWINGS

FIG. 3 is a table showing an example of conditions for outputting DPDT control signals;

DETAILED DESCRIPTION OF THE INVENTION

Described below in detail is an embodiment of the present invention, with reference to FIGS. 1 to 8.

Main Configuration of Wireless Communications Apparatus

Figure 1:
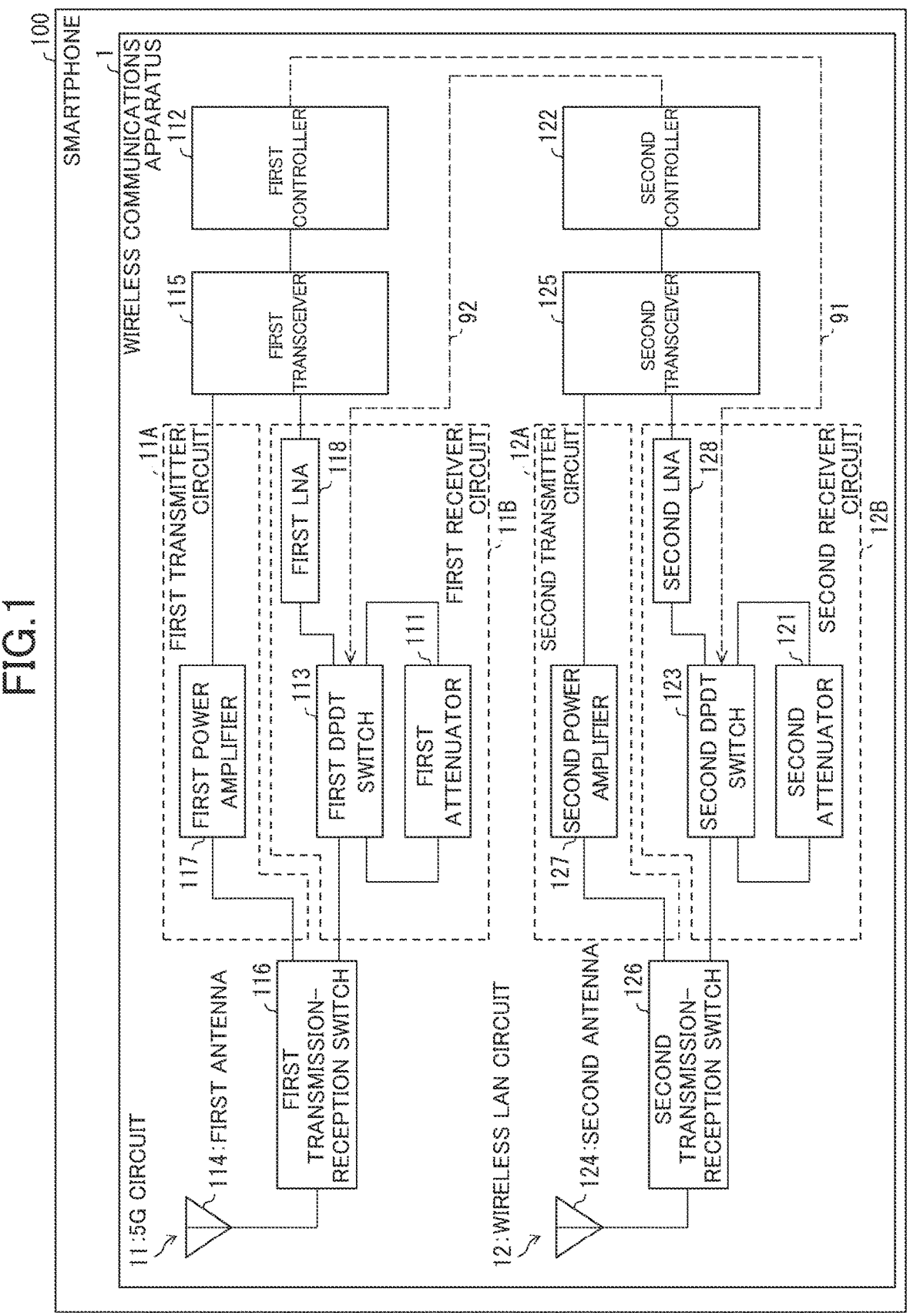
FIG. 1 is a block diagram illustrating an example of a main configuration of a wireless communications apparatus according to an embodiment of the present invention.

FIG. 1 is a block diagram illustrating an example of a main configuration of a wireless communications apparatus 1 according to this embodiment. The wireless communications apparatus 1 is, for example, embedded in a communications device (an electronic device) such as a smartphone 100 illustrated in FIG. 1. As illustrated in FIG. 1, the wireless communications apparatus 1, for example, includes a plurality of wireless circuits to transmit and receive signals. In the example of FIG. 1, the wireless communications apparatus 1 includes two wireless circuits: a 5G circuit 11 (a first circuit) communicating on a fifth-generation mobile communications system; and a wireless local area network (LAN) circuit 12 (a second circuit) communicating on a wireless LAN system.

As an example, the 5G circuit 11 transmits and receives a signal, using a frequency band including at least one of a 3.7 GHz band and a 4.5 GHz band. Note that the 3.7 GHz band ranges from 3.6 to 3.8 GHz. The 4.5 GHz band ranges from 4.5 to 4.6 GHz. Hereinafter, the 3.7 GHz band and the 4.5 GHz band may collectively be referred to as a "sub-6 GHz band."

The 5G circuit 11 may further use a 28 GHz band. The 28 GHz band ranges from 27.00 to 29.50 GHz.

As an example, the wireless LAN circuit 12 is a wireless circuit to communicate on the wireless LAN system. The wireless LAN circuit 12 uses a frequency band ranging, for example, from 5.150 to 5.725 GHz. This range is known as what is referred to as a "5 GHz band." Note that the frequency band to be used for the wireless LAN circuit 12 is not limited to the 5 GHz band. For example, the wireless LAN circuit 12 may use what is referred to as a "2.4 GHz band (2.400 to 2.497 GHz)."

As can be seen, the frequency bands to be used for the 5G circuit 11 and the wireless LAN circuit 12 are close to each other. In such a case, the transmission signal transmitted from one of the wireless circuits is likely to influence the other one of the wireless circuits. In particular, when the 5G circuit 11 uses the 4.5 GHz band and the wireless LAN circuit 12 uses the 5 GHz band, the frequency bands to be used for the two wireless circuits are closest to each other. Hence, the chance of the influence will be greater. Note that the "influence" includes, but not limited to, deterioration in reception characteristics, or breakdown of components, of the 5G circuit 11 and the wireless LAN circuit 12.

Configuration of 5G Circuit 11

As illustrated in FIG. 1, the 5G circuit 11 includes, for example: a first attenuator 111 (an attenuator, or a second attenuator); a first controller 112 (a controller); a first double-pole-double-throw (DPDT) switch 113; a first antenna 114; a first transceiver 115; a first transmission-reception switch 116; a first power amplifier 117; and a first low-noise amplifier (LNA) 118. Note that, in the 5G circuit 11 of the drawing, the reference sign 11A denotes a first transmitter circuit that is a transmitter circuit of the 5G circuit 11, and the reference sign 11B denotes a first receiver circuit that is a receiver circuit of the 5G circuit 11. In the description below, the transmitter circuit and the receiver circuit are respectively referred to as the first transmitter circuit 11A and the first receiver circuit 11B.

The first controller 112 integrally controls the constituents of the 5G circuit 11. As an example, the first controller 112 controls the first transceiver 115 and the first transmission-reception switch 116.

The first transceiver 115, controlled by the first controller 112, transmits and receives a signal in the 5G circuit 11. The first power amplifier 117 amplifies the signal input from the first transceiver 115, and outputs the amplified signal to the first antenna 114. The first transmission-reception switch 116, controlled by the first controller 112, connects the first antenna 114 to the first transmitter circuit 11A or to the first receiver circuit 11B.

As an example, when the first transceiver 115 transmits a signal (hereinafter referred to as a "transmission signal"), the first controller 112 causes the first transmission-reception switch 116 to switch a connection of the first antenna 114 from the first receiver circuit 11B to the first transmitter circuit 11A. The transmission signal to be transmitted by the first transceiver 115 is amplified by the first power amplifier 117, and transmitted outside from the first antenna 114.

Moreover, when the first transceiver 115 finishes transmitting the signal, the first controller 112 causes the first transmission-reception switch 116 to switch the connection of the first antenna 114 back to the first receiver circuit 11B.

The first DPDT switch 113 connects the first antenna 114 and the first LNA 118 together. The first DPDT switch 113 is controlled with a DPDT control signal 92 to be output by a second controller 122 to be described later. The first DPDT switch 113 switches whether a reception signal received by the first antenna 114 passes through the first attenuator 111 before entering the first LNA 118. The DPDT control signal 92 is, for example, either an ON signal to turn the first DPDT switch 113 ON or an OFF signal to turn the first DPDT switch 113 OFF. The first LNA 118 amplifies the reception signal input with noise amplification reduced, and outputs the amplified reception signal to the first transceiver 115.

The first transceiver 115 outputs the obtained reception signal to the first controller 112. The first controller 112 executes processing based on the obtained reception signal.

The first attenuator 111 attenuates a signal received by the 5G circuit 11. An example of the signal includes a signal transmitted from the wireless LAN circuit 12.

Moreover, the first controller 112 controls (executes attenuation control) a second DPDT switch 123 (to be described later) included in the wireless LAN circuit 12. Details of this control will be described later.

Configuration of Wireless LAN Circuit 12

As illustrated in FIG. 1, the wireless LAN circuit 12 includes for example: a second attenuator 121 (an attenuator); the second controller 122 (a controller, or a second controller); the second DPDT switch 123 (a switch, or a DPDT switch); a second antenna 124 (an antenna); a second transceiver 125 (a receiver); a second transmission-reception switch 126; a second power amplifier 127; and a second LNA 128. Note that, in the wireless LAN circuit 12 of the drawing, the reference sign 12A denotes a second transmitter circuit that is a transmitter circuit of the wireless LAN circuit 12, and the reference sign 12B denotes a second receiver circuit that is a receiver circuit of the wireless LAN circuit 12. In the description below, the transmitter circuit and the receiver circuit are respectively referred to as the second transmitter circuit 12A and the second receiver circuit 12B.

The second controller 122 integrally controls the constituents of the wireless LAN circuit 12. As an example, the second controller 122 controls the second transceiver 125 and the second transmission-reception switch 126.

The second transceiver 125, controlled by the second controller 122, transmits and receives a signal in the wireless LAN circuit 12. The second power amplifier 127 amplifies the signal input from the second transceiver 125, and outputs the amplified signal to the second antenna 124. The second transmission-reception switch 126, controlled by the second controller 122, connects the second antenna 124 to the second transmitter circuit 12A or to the second receiver circuit 12B.

As an example, when the second transceiver 125 transmits a transmission signal (a second transmission signal), the second controller 122 causes the second transmission-reception switch 126 to switch a connection of the second antenna 124 from the second receiver circuit 12B to the second transmitter circuit 12A. The transmission signal to be transmitted by the second transceiver 125 is amplified by the second power amplifier 127, and transmitted outside from the second antenna 124.

Moreover, when the second transceiver 125 finishes transmitting the signal, the second controller 122 causes the second transmission-reception switch 126 to switch the connection of the second antenna 124 back to the second receiver circuit 12B.

The second DPDT switch 123 connects the second antenna 124 and the second LNA 128 together. The second DPDT switch 123 is controlled with a DPDT control signal 91 to be output by the first controller 112. The second DPDT switch 123 switches whether a reception signal (a second reception signal) received by the second antenna 124 passes through the second attenuator 121 before entering the second LNA 128. The DPDT control signal 91 is, for example, either an ON signal to turn the second DPDT switch 123 ON or an OFF signal to turn the second DPDT switch 123 OFF. The second LNA 128 amplifies the reception signal input with noise amplification reduced, and outputs the amplified reception signal to the second transceiver 125.

The second transceiver 125 outputs the obtained reception signal to the second controller 122. The second controller 122 executes processing based on the obtained reception signal.

The second attenuator 121 attenuates a signal received by the wireless LAN circuit 12. An example of the signal includes a signal transmitted from the 5G circuit 11.

Moreover, as described above, the second controller 122 controls (second attenuation control) the first DPDT switch 113 included in the 5G circuit 11.

Switching on DPDT Switch

Each of the first DPDT switch 113 and the second DPDT switch 123 has two inputs and two outputs. Operation examples of a DPDT switch are described, with reference to FIG. 2.

Figure 2:
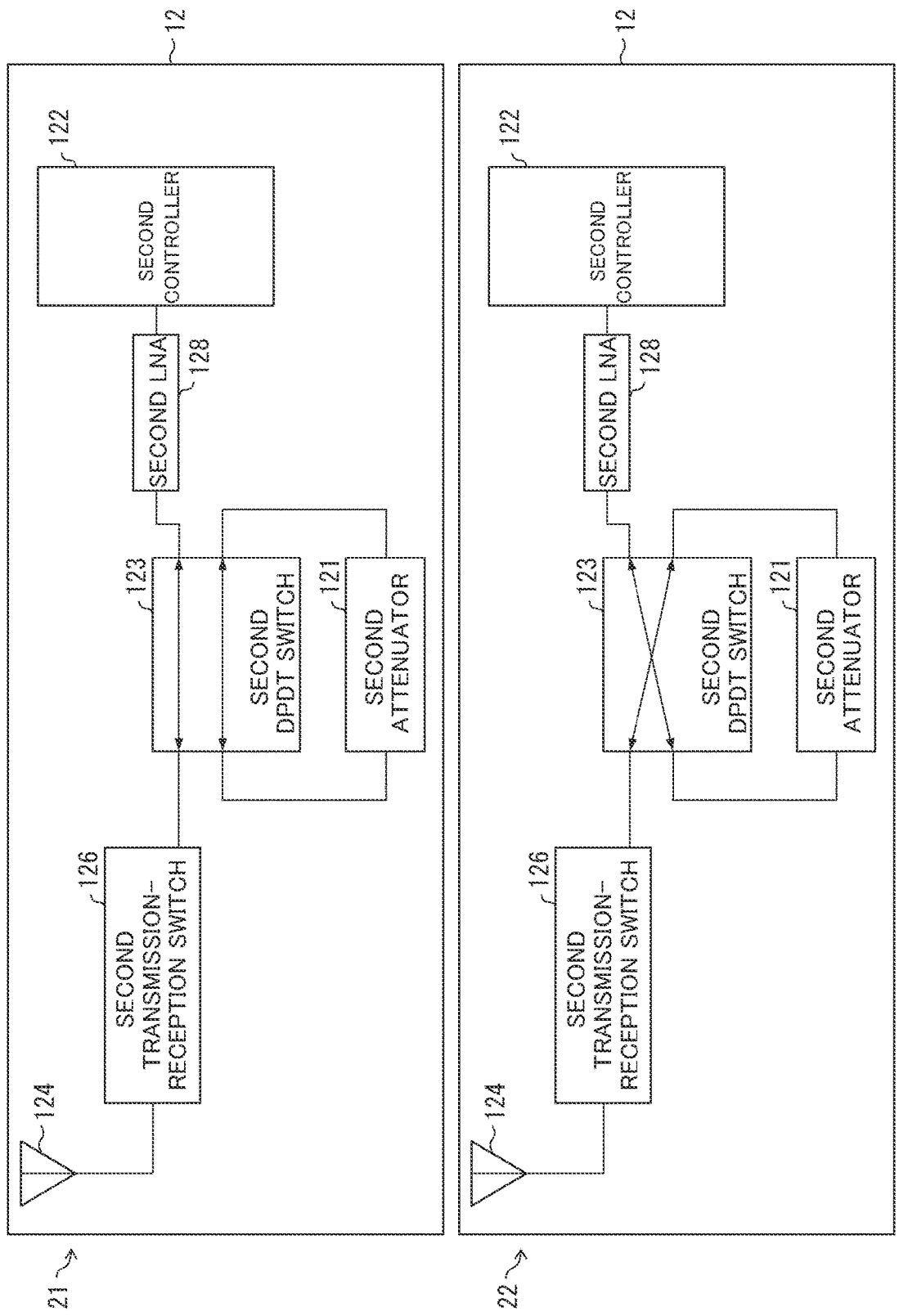
FIG. 2 is an illustration showing switching on a DPDT switch included in the wireless communications apparatus in FIG. 1.

FIG. 2 is an illustration showing switching on the second DPDT switch in FIG. 1. An operation pattern 21 in FIG. 2 shows a case where the second DPDT switch 123 is OFF. In such a case, the second DPDT switch 123 connects the second antenna 124 and the second LNA 128 together without the second attenuator 121. That is, the reception signal received by the second antenna 124 is input to the second LNA 128, not passing through the second attenuator 121.

Meanwhile, an operation pattern 22 shows a case where the second DPDT switch 123 is ON. In such a case, the second DPDT switch 123 connects the second antenna 124 and the second LNA 128 together through the second attenuator 121. That is, the reception signal received by the second antenna 124 passes through the second attenuator 121 (that is, the reception signal is attenuated by the second attenuator 121), and is input to the second LNA 128.

Described here as an example is the second DPDT switch 123 in the wireless LAN circuit 12. ON and OFF states of the first DPDT switch 113 in the 5G circuit 11 are similar to the ON and OFF states of the second DPDT switch 123.

Conditions for Outputting DPDT Control Signals

Described next are conditions for outputting the DPDT control signals 91 and 92, with reference to FIG. 3.

FIG. 3 is a table showing an example of conditions for outputting the DPDT control signals 91 and 92 in the wireless communications apparatus 1. The table is stored in a not-shown storage unit. With reference to the table, the first controller 112 and the second controller 122 determine whether an ON signal is output. Note that the data indicating the above output conditions shall not be limited to one in the form of a table shown in FIG. 3.

Specifically, the first controller 112 and the second controller 122 do not output the ON signal either if the level of the transmission signal is a predetermined threshold or below, or if the frequency of the transmission signal is out of a predetermined range. That is, the first DPDT switch 113 and the second DPDT switch 123 are left OFF.

Meanwhile, the first controller 112 and the second controller 122 output the ON signal both of if the level of the transmission signal exceeds the predetermined threshold and if the frequency of the transmission signal is within the predetermined range. Hence, the first DPDT switch 113 and the second DPDT switch 123 turn ON.

Here, the case where the level of the transmission signal exceeds the predetermined threshold and where the frequency of the transmission signal is within the predetermined range means that "the transmission signal that one of the 5G circuit 11 and the wireless LAN circuit 12 transmits is received by the other one of the 5G circuit 11 and the wireless LAN circuit 12, and the received transmission signal is highly likely to influence the receiving circuit."

That is, if either circuit to receive a signal receives the transmission signal, and the circuit receiving the transmission signal is highly likely to be influenced by the transmission signal, the first controller 112 and the second controller 122 turn the DPDT switch ON so that the transmission signal is input to the attenuator.

Hereinafter, the conditions that "the level of the transmission signal exceeds the predetermined threshold (a first condition) and the frequency of the transmission signal is within the predetermined range (a second condition)" may be referred to as a "signal condition." Furthermore, a signal condition of the 5G circuit 11 to the transmission signal may be referred to as a "first signal condition", and a signal condition of the wireless LAN circuit 12 to the transmission signal may be referred to as a "second signal condition."

Note that, as an example, the first controller 112 and the second controller 122 output the OFF signal upon the end of the transmission of the transmission signal whose level is higher than or equal to the threshold and whose frequency is within the predetermined range. Hence, the first DPDT switch 113 and the second DPDT switch 123 return to OFF.

Specific Examples of Determinations Based on Signal Conditions

Described next with reference to FIGS. 4 to 7 are specific examples of determinations whether the DPDT control signals 91 and 92 satisfy signal conditions. Note that described here as an example is a case where the wireless LAN circuit 12 is to receive a signal and the 5G circuit 11 is to transmit the signal.

Figure 4:
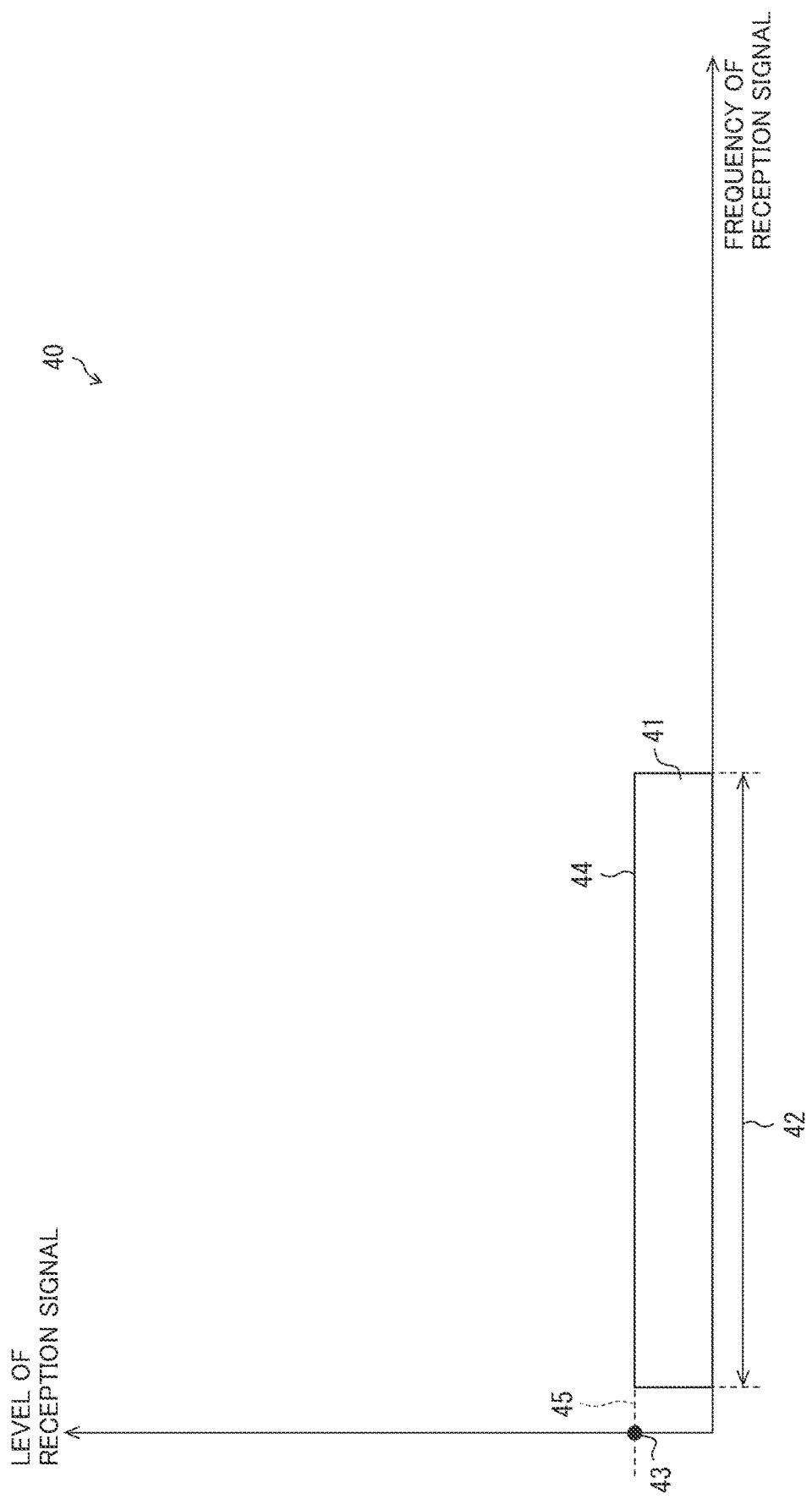
FIG. 4 is a graph illustrating an example of a relationship between a signal level and a frequency of a reception signal in a wireless circuit receiving the signal.

FIG. 4 is a graph illustrating an example of a relationship between a signal level and a frequency of a reception signal in a wireless circuit included in the wireless communications apparatus 1 and receiving the signal. That is, FIG. 4 is a graph illustrating a relationship between a signal level and a frequency of the reception signal in the wireless LAN circuit 12.

As illustrated in FIG. 4, a graph 40 includes a rectangular region 41 illustrating the above relationship. A range 42 corresponding to the length of a long side of the region 41 is a range of an operation frequency (an operation frequency band) of the second receiver circuit 12B in the wireless LAN circuit 12.

Here, the "operation frequency" is a range from the minimum value to the maximum value of a frequency at which a component of the second receiver circuit 12B operates. A range of a frequency to be actually used for the second receiver circuit 12B (an actual use frequency) could be narrower than the range 42. Used here is not the range of the actual use frequency, but the range 42 of the operation frequency.

A point 43 is an intersection of the vertical axis of the graph 40 and a straight line 45. The straight line 45 extends toward the vertical axis from a long side 44, of the region 41, not in contact with the horizontal axis of the graph 40. A value of a signal level indicated by the point 43 is the upper limit of the signal level not influencing reception characteristics.

In other words, if the level of a signal received by the second receiver circuit 12B is higher than the value indicated by the point 43, a component (e.g. the second LNA 128) of the second receiver circuit 12B is likely to be broken. That is, the value indicated by the point 43 is a threshold of a signal level of the transmission signal from the 5G circuit 11 (see FIG. 3).

Note that the value indicated by the point 43 may be the upper limit of a signal level at which a component of the second receiver circuit 12B is not broken. In such a case, the transmission level of the transmission signal, which exhibits decrease in reception characteristics of the second receiver circuit 12B, is lower than or equal to the threshold. Hence, the transmission signal of the 5G circuit 11 is likely to deteriorate the reception characteristics.

The frequency range indicated by the range 42 and the threshold indicated by the point 43 are measured and identified when, for example, the circuit is designed. The determined frequency range and threshold are stored in a not-shown storage unit of the wireless communications apparatus 1.

Figure 5:
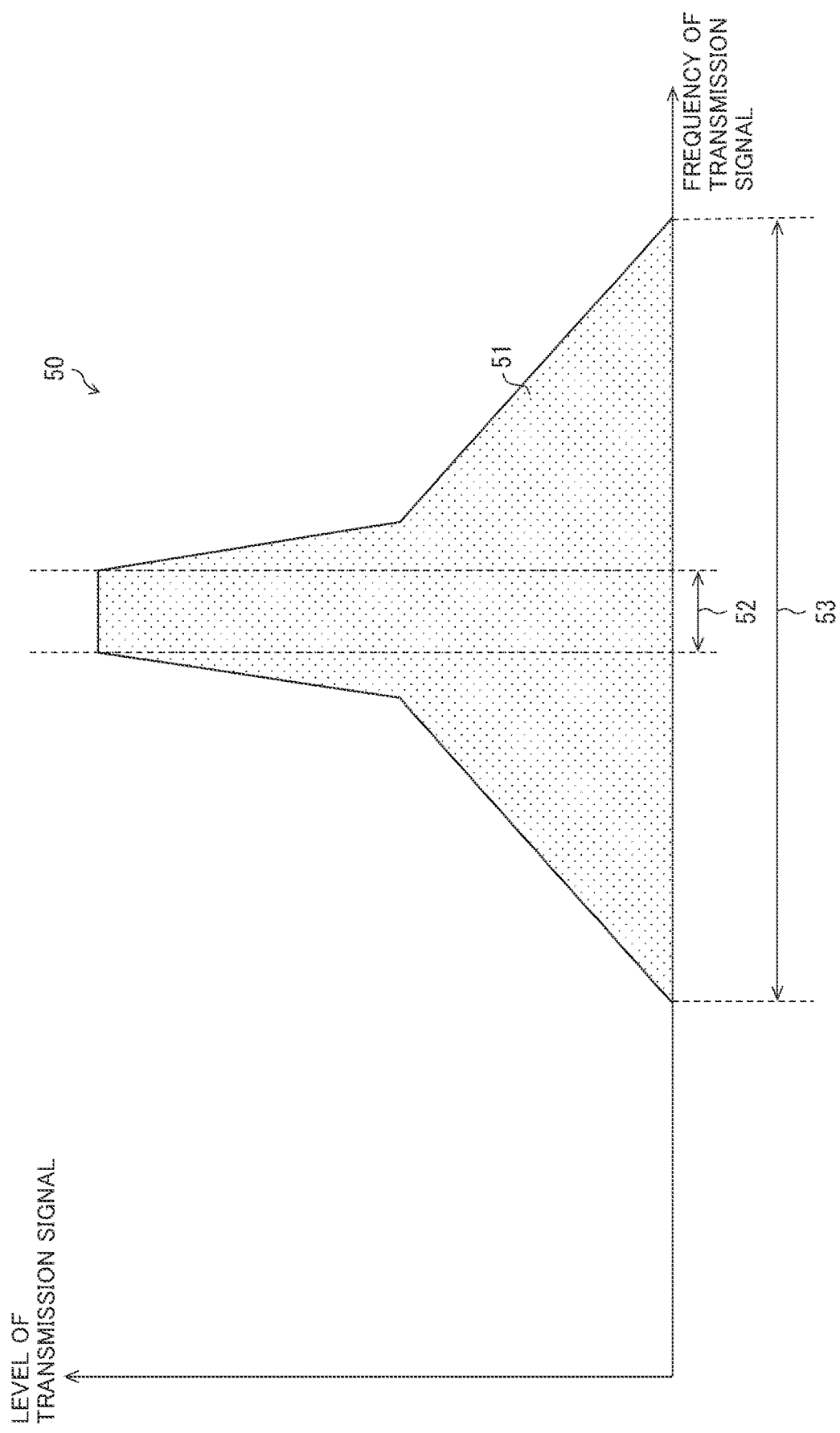
FIG. 5 is a graph illustrating an example of a relationship between a signal level and a frequency of a transmission signal in a circuit transmitting a signal.

FIG. 5 is a graph illustrating an example of a relationship between a signal level and a frequency of a transmission signal in a circuit transmitting a signal. That is, FIG. 5 is a graph illustrating a relationship between a signal level and a frequency of a transmission signal in the 5G circuit 11.

As illustrated in FIG. 5, a graph 50 includes a region 51 illustrating the above relationship. A range 52 is a defined range of a frequency (a frequency band) of the transmission signal indicated by the region 51. Meanwhile, in transmitting a signal, a signal level higher than 0 can be measured out of the frequency band indicated by the range 52. A range 53 is a range of a frequency at which the signal level of the transmission signal is higher than 0.

The frequency range indicated by the range 53 and the signal level in the frequency range are identified for each transmission of a signal by the 5G circuit 11. For example, the wireless communications apparatus 1 stores in the not-shown storage unit a table holding a kind of a transmission signal, a frequency range of the transmission signal, and a signal level in the frequency range in association with one another. With reference to the table, the first controller 112 identifies the frequency range and the signal level at the frequency.

Figure 6:
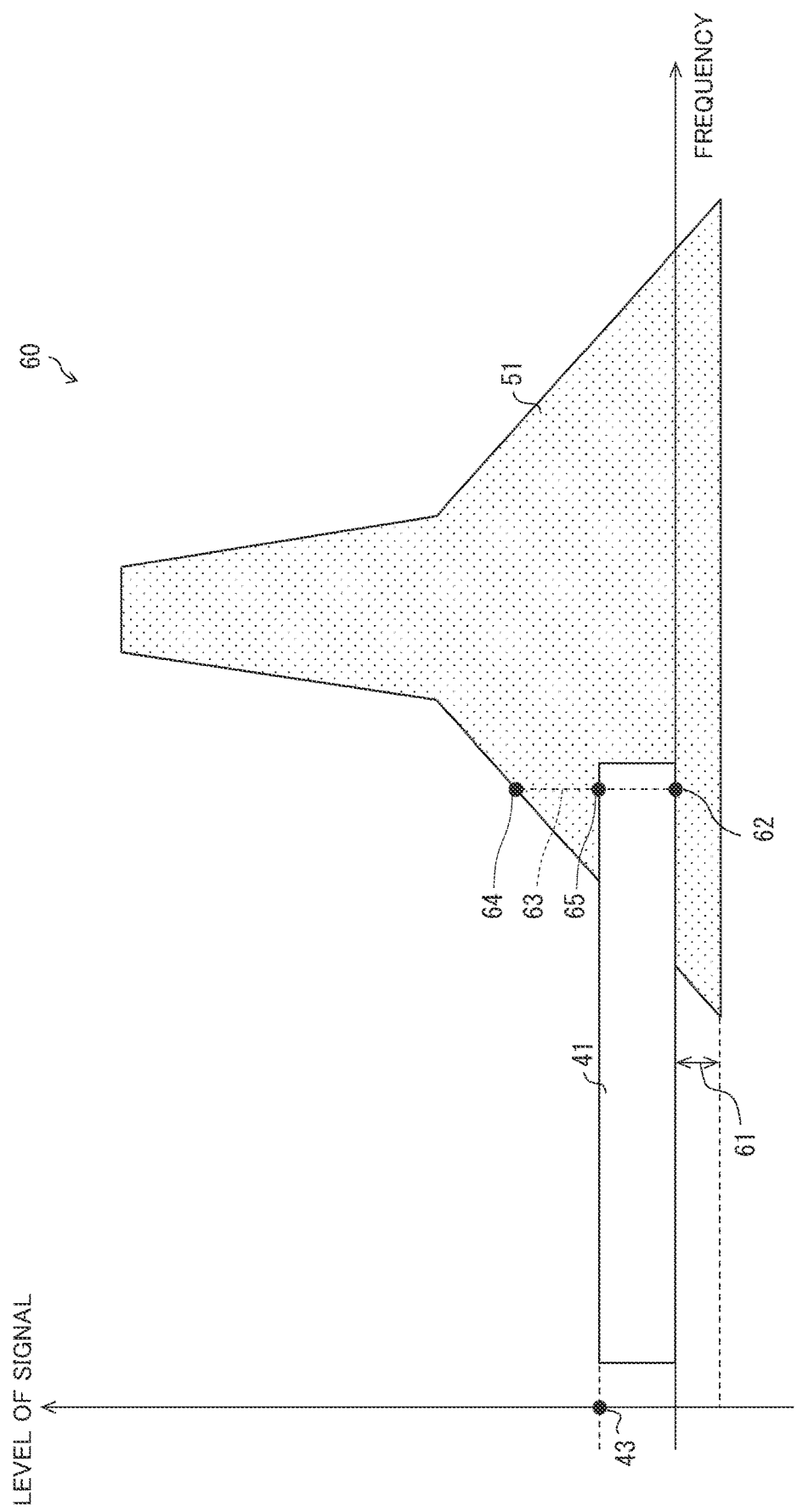
FIG. 6 is an illustration to show an example of a determination whether the transmission signal satisfies a signal condition.

FIG. 6 is an illustration to show an example of a determination whether the transmission signal satisfies a signal condition. The first controller 112 determines whether the operation frequency of the second receiver circuit 12B and the identified frequency range of the transmission signal at least partially overlap each other.

Here, the statement "the operation frequency of the second receiver circuit 12B and the identified frequency range of the transmission signal at least partially overlap each other" corresponds to the region 41 and the region 51 at least partially overlapping each other as illustrated in FIG. 6.

Moreover, in the identified frequency range, of the transmission signal, overlapping the operation frequency, the first controller 112 determines whether a result of a subtraction of a value based on a degree of coupling from the identified signal level of the transmission signal exceeds the threshold.

The degree of conductivity means a degree of conductivity between the first antenna 114 of the 5G circuit 11 and the second antenna 124 of the wireless LAN circuit 12. The degree of conductivity is identified when, for example, the circuit is designed. The identified degree of conductivity is stored in the not-shown storage unit of the wireless communications apparatus 1.

Furthermore, the statement "a subtraction of a value based on a degree of coupling from the identified signal level of the transmission signal" corresponds to a shift of the range 51 in a negative direction of the vertical axis by a value 61 based on the degree of conductivity.

Moreover, the statement "a result of a subtraction of a value based on a degree of coupling from the identified signal level of the transmission signal exceeds the threshold" corresponds to a case where, when focusing on a point (e.g. a point 62) indicating a frequency, an intersection 64 of an outline of the region 51 and a straight line 63 extending from the point 62 in a positive direction of the vertical axis is positioned in a direction toward a greater positive value than an intersection 65 of the straight line 63 and an outline of the region 41 is.

In the example of FIG. 6, a frequency of the transmission signal at the point 62 is also the operation frequency of the wireless LAN circuit 12. Moreover, the signal level of the transmission signal at the point 62 exceeds the threshold. Hence, the first controller 112 determines that the transmission signal indicated by the graph 60 satisfies the first signal condition. Accordingly, the first controller 112 inputs an ON signal to the second DPDT switch 123 to turn the second DPDT switch 123 ON.

Figure 7:
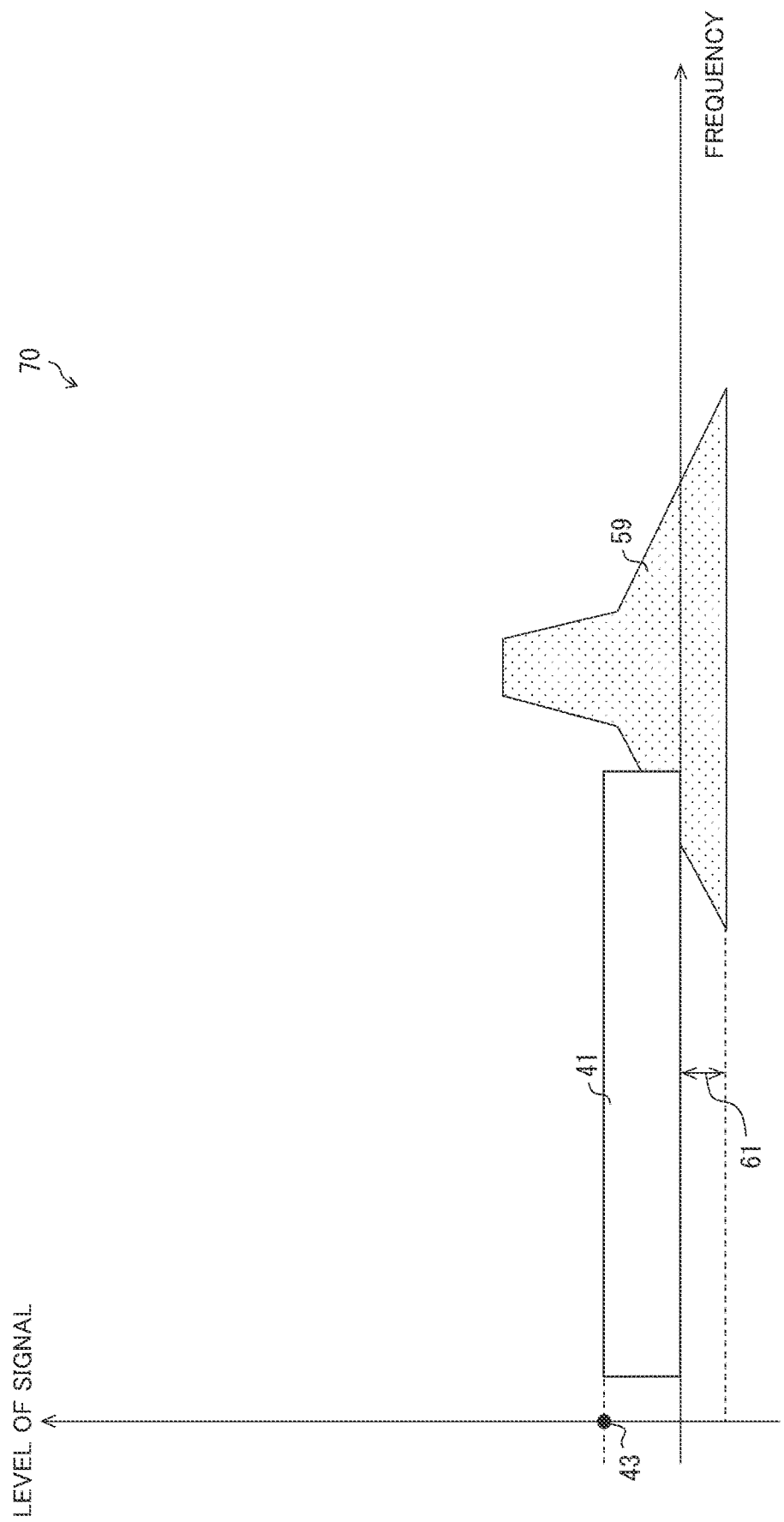
FIG. 7 is an illustration to show another example of the determination whether the transmission signal satisfies the signal condition.

FIG. 7 is an illustration to show another example of the determination whether the transmission signal satisfies the signal condition. A graph 70 in FIG. 7 shows that, in the frequency range overlapping the operation frequency, when the degree of coupling is subtracted from the identified signal level of the transmission signal, the resulting value does not exceed the threshold. Hence, the first controller 112 determines that the transmission signal indicated by the graph 70 does not satisfy the first signal condition. In this case, the first controller 112 does not input an ON signal to the second DPDT switch 123, and the second DPDT switch 123 is left OFF.

The second controller 122 also executes a similar determination. Note that the second controller 122 determines whether the transmission signal of the wireless LAN circuit 12 satisfies the second signal condition, using the signal level and the frequency of the reception signal of the 5G circuit 11, the degree of coupling, and the signal level and the frequency of the transmission signal of the wireless LAN circuit 12. The signal level and the frequency of the reception signal of the 5G circuit 11 and the degree of coupling are stored in the storage unit of the wireless communications apparatus 1. The signal level and the frequency of the transmission signal of the wireless LAN circuit 12 are identified by the second controller 122 for each transmission of the signal by the wireless LAN circuit 12.

Sequence of Attenuation Processing

Figure 8:
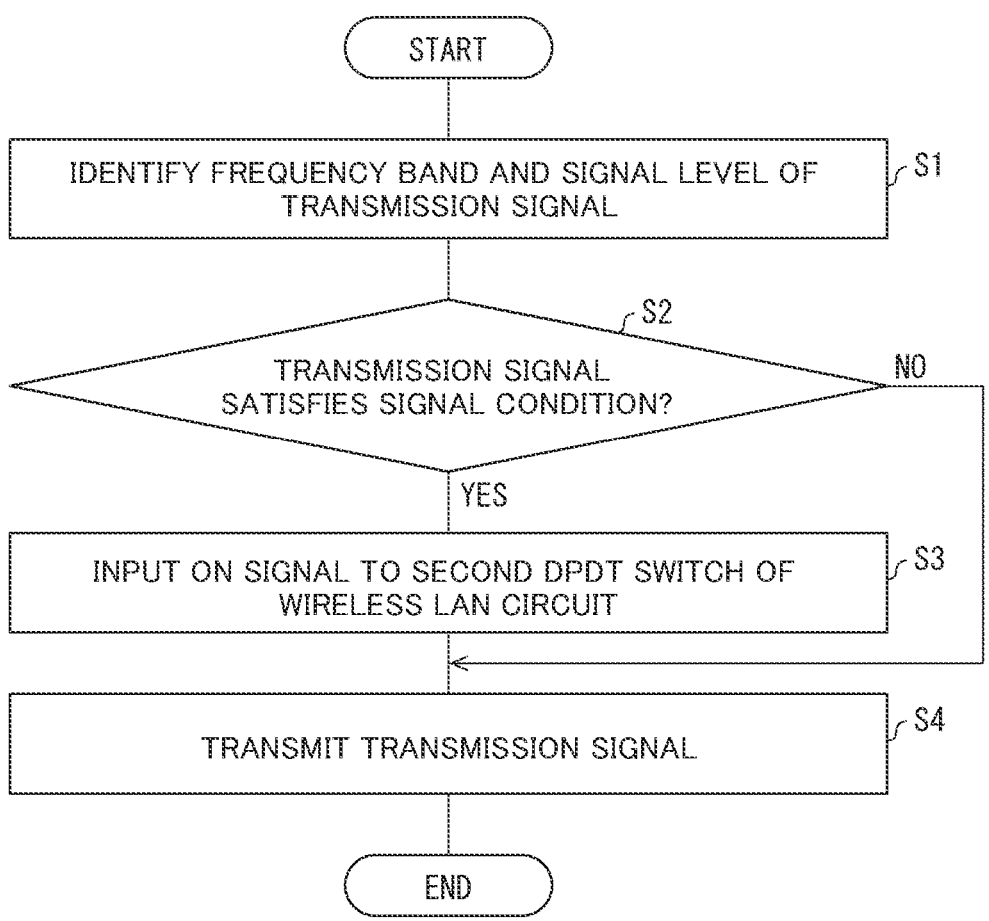
FIG. 8 is a flowchart showing an example of a sequence of attenuation processing executed by the wireless communications apparatus in FIG. 1.

FIG. 8 is a flowchart showing an example of a sequence of attenuation processing executed by the first controller 112.

At Step S1, the first controller 112 identifies a frequency band and a signal level of a transmission signal in the 5G circuit 11.

At Step S2 (determining), the first controller 112 determines whether the identified transmission signal satisfies the first signal condition. If the determination indicates that the transmission signal satisfies the first signal condition (the result of determination at Step S2: YES), at Step S3 (controlling), the first controller 112 inputs an ON signal to the second DPDT switch 123 of the wireless LAN circuit 12. Hence, the second DPDT switch 123 turns ON. Meanwhile, if the determination indicates that the transmission signal does not satisfy the first signal condition (the result of determination at Step S2: NO), the first controller 112 does not execute Step S3, and the processing proceeds to Step S4.

At Step S4, the first controller 112 causes the first transceiver 115 to transmit the transmission signal. Even if the transmission signal is received by the wireless LAN circuit 12, the second DPDT switch 123 is ON. Hence, the transmission signal is input to the second LNA 128 through the second attenuator 121. That is, the transmission signal is attenuated by the second attenuator 121 and input to the second LNA 128. Hence, the attenuation processing can minimize influence of the transmission signal on the wireless LAN circuit 12.

Note that the sequence of the attenuation processing executed by the second controller 122 is similar to that of the attenuation processing executed by the first controller 112. Described below is the sequence of the attenuation processing executed by the second controller 122. In the description below, Steps S1' to S4' correspond to Steps S1 to S4 in FIG. 8.

At Step S1', the second controller 122 identifies a frequency band and a signal level of a transmission signal in the wireless LAN circuit 12.

At Step S2' (determining), the second controller 122 determines whether the identified transmission signal satisfies the second signal condition. If the determination indicates that the transmission signal satisfies the second signal condition (the result of determination at Step S2': YES), at Step S3' (controlling), the second controller 122 inputs an ON signal to the first DPDT switch 113 of the 5G signal circuit 11. Hence, the first DPDT switch 113 turns ON. Meanwhile, if the determination indicates that the transmission signal does not satisfy the second signal condition (the result of determination at Step S2': NO), the second controller 122 does not execute Step S3, and the processing proceeds to Step S4'.

At Step S4', the second controller 122 causes the second transceiver 125 to transmit the transmission signal. Even if the transmission signal is received by the 5G circuit 11, the first DPDT switch 113 is ON. Hence, the transmission signal is input to the first LNA 118 through the first attenuator 111. That is, the transmission signal is attenuated by the first attenuator 111 and input to the first LNA 118. Hence, the attenuation processing can minimize influence of the transmission signal on the 5G circuit 11.

Advantageous Effects

As can be seen, the wireless communications apparatus 1 according to this embodiment includes the 5G circuit 11 and the wireless LAN circuit 12. The wireless LAN circuit 12 in the wireless communications apparatus 1 includes the second attenuator 121. The wireless communications apparatus 1 includes the first controller 112 directing a signal, transmitted by the 5G circuit 11 and received by the wireless LAN circuit 12, to pass through the second attenuator 121 if the first signal condition is satisfied, and keeping the signal from passing through the second attenuator 121 if the first signal condition is not satisfied.

In the above features, if the first signal condition is satisfied, the first controller 112 directs the signal, transmitted by the 5G circuit 11 and received by the wireless LAN circuit 12, to pass through the second attenuator 121. Such features make it possible to reduce influence to be likely exerted by the signal on the wireless LAN circuit 12. If the first signal condition is not satisfied, the first controller 112 keeps the signal from passing through the second attenuator 121. Hence, the above features make it possible to minimize the influence of the signal on reception characteristics of the wireless LAN circuit 12. As a result, the wireless communications apparatus 1 can protect the wireless LAN circuit 12 while minimizing influence on the reception characteristics of the wireless LAN circuit 12.

The wireless communications apparatus 1 includes the first attenuator 111 in the 5G circuit 11. Moreover, the wireless communications apparatus 1 includes the second controller 122 directing a signal, transmitted by the wireless LAN circuit 12 and received by the 5G circuit 12, to pass through the first attenuator 111 if the second signal condition is satisfied, and keeping the signal from passing through the first attenuator 111 if the second signal condition is not satisfied.

The applicants have found out that the 5G circuit 11 is influenced by a transmission signal transmitted from the wireless LAN circuit 12. In the above features, if the second signal condition is satisfied, the second controller 122 directs the signal, transmitted by the wireless LAN circuit 12 and received by the 5G circuit 11, to pass through the first attenuator 111. The above features make it possible to reduce influence to be likely exerted by the signal on the 5G circuit 11. If the second signal condition is not satisfied, the second controller 122 keeps the signal from passing through the first attenuator 111. The above features make it possible to minimize the influence of the signal on reception characteristics of the 5G circuit 11. As a result, the wireless communications apparatus 1 can protect the 5G circuit 11 while minimizing influence on the reception characteristics of the 5G circuit 11.

In the wireless communications apparatus 1, the first signal condition satisfies a condition that a level of a transmission signal transmitted by any one of the wireless circuits exceeds a predetermined threshold, and the second signal condition satisfies a condition that a frequency of the transmission signal is within a predetermined range.

In the above feature, the first signal condition and the second signal condition are respectively determined in accordance with the level and the frequency of the transmission signal. If one of the wireless circuits is likely to be influenced by the transmission signal of the other one of the wireless circuits, the above feature makes it possible to appropriately attenuate the transmissions signal.

In the wireless communications apparatus 1, the first controller 112 identifies a transmission level of a transmission signal from the 5G circuit 11 and a frequency band to be used for transmitting the transmission signal. The first controller 112 determines whether the identified frequency band and an operation frequency band of the receiver circuit included in the wireless LAN circuit 12 at least partially overlap each other. The first controller 112 determines whether a value based on the identified transmission level and a degree of coupling exceeds a threshold.

In the wireless communications apparatus 1, the second controller 122 identifies a transmission level of a transmission signal from the wireless LAN circuit 12 and a frequency band to be used for transmitting the transmission signal. The second controller 122 determines whether the identified frequency band and an operation frequency band of the receiver circuit included in the 5G circuit 11 at least partially overlap each other. The second controller 122 determines whether a value based on the identified transmission level and a degree of coupling exceeds a threshold.

If the determinations indicate that the operation frequency band and the identified frequency band at least partially overlap each other and the above value exceeds the threshold value, the first signal condition and the second signal condition are satisfied.

The above features make it possible to precisely identify a situation in which a transmission signal transmitted from one of the wireless circuits is highly likely to influence the other one of the wireless circuits. As a result, the features make it possible to appropriately attenuate the transmission signal in such a situation. The reception signal is not attenuated unless the above situation arises. Hence, the features make it possible to minimize influence of the reception signal on reception characteristics of the 5G circuit 11 and the wireless LAN circuit 12.

If, in the wireless communications apparatus 1, the first signal condition is satisfied, the first controller 112 causes the second DPDT switch 123 to connect the second antenna 124 and the second LNA 128 together through the second attenuator 121. Meanwhile, if the first signal condition is not satisfied, the first controller 112 causes the second DPDT switch 123 to connect the second antenna 124 and the second LNA 128 together without the second attenuator 121.

If, in the wireless communications apparatus 1, the second signal condition is satisfied, the second controller 122 causes the first DPDT switch 113 to connect the first antenna 114 and the first LNA 118 together through the first attenuator 111. Meanwhile, if the second signal condition is not satisfied, the second controller 122 causes the first DPDT switch 113 to connect the first antenna 114 and the first LNA 118 together without the first attenuator 111.

In the above features, the first controller 112 and the second controller 122 control the switches in accordance with a signal condition, and control whether the received transmission signal passes through the attenuator. Such features make it possible to protect both the 5G circuit 11 and the wireless LAN circuit 12 while minimizing influence on the reception characteristics of the wireless circuits.

Note that, for the 5G circuit 11 and the wireless LAN circuit 12, the first LNA 118 and the second LNA 128 are not essential. If the first signal condition is satisfied when the wireless LAN circuit 12 does not include the second LNA 128, the second antenna 124 and the second transceiver 125 connect to each other through the second attenuator 121. Similarly, if the second signal condition is satisfied when the 5G circuit 11 does not include the first LNA 118, the first antenna 114 and the first transceiver 115 connect to each other through the first attenuator 111.

Thanks to the above features, the DPDT switches adopted to the two wireless circuits can simplify the wireless circuits. As a result, on the wireless circuits, the footprints can be reduced and the wiring layout can be simplified.

In the wireless communications apparatus 1, the wireless LAN circuit 12 is a wireless circuit for a wireless LAN using a frequency band including a 5 GHz band. Thanks to such a feature, a frequency band to be used for the wireless LAN circuit 12 is close to a frequency band (in particular, the sub-6 GHz band) for the 5G circuit 11. That is, the 5G circuit 11 and the wireless LAN circuit 12 are likely to be influenced by the transmission signals from each other. If, in such a feature, a signal condition is satisfied for a transmission signal, the circuit receiving the transmission signal allows the transmission signal to pass through the attenuator. Hence, in the combination of the wireless circuits susceptible to the transmission signals from each other, the feature makes it possible to protect the wireless circuits.

In the wireless communications apparatus 1, the 5G circuit 11 transmits and receives a signal, using a frequency band including a 4.5 GHz band. In this feature, the combination of the two wireless circuits is most susceptible to the transmission signals from each other. If, in such a feature, a signal condition is satisfied for a transmission signal, the circuit receiving the transmission signal allows the transmission signal to pass through the attenuator. Hence, in the combination of the wireless circuits most susceptible to the transmission signals from each other, the feature makes it possible to protect the wireless circuits.

Modifications

Described in the above embodiment is the wireless communications apparatus 1 including two wireless circuits. The wireless communications apparatus 1 may include not only "two" wireless circuits but also two or more wireless circuits.

Moreover, the wireless communications apparatus 1 may include at least one 5G circuit 11 and at least one wireless circuit satisfying at least one of the conditions that the wireless circuit "can be influenced by a transmission signal to be transmitted from the 5G circuit 11" and that the wireless circuit "transmits a transmission signal that can influence the 5G circuit 11." That is, the wireless circuit included in the wireless communications apparatus 1 other than the 5G circuit 11 is not limited to the wireless LAN circuit 12. Such a wireless circuit may, for example, transmit a transmission signal that is likely to influence the 5G circuit 11; however, the wireless circuit may be free from influence of a transmission signal to be transmitted from the 5G circuit 11. This wireless circuit may be, for example, influenced by a transmission signal to be transmitted from the 5G circuit 11; however, the wireless circuit itself may transmit a transmission signal that does not influence the 5G circuit 11. A wireless circuit other than the 5G circuit 11 may include one communicating on, for example, a 5 GHz wireless access system.

In the above example, the DPDT switches are used to switch whether to have the attenuators between the antennas and the LNAs connect the antennas and the LNAs together. However, the switches shall not be limited to the DPDT switches. For example, the switches may be single-pole-double-through (SPDT) switches. In such an example, a first SPDT switch is disposed between a transmission-reception switch and an attenuator, and a second SPDT switch is disposed between another attenuator and an LNA.

In the above embodiment, the signal condition satisfies both of the conditions that "the level of the transmission signal exceeds the predetermined threshold and the frequency of the transmission signal is within the predetermined range." However, the signal condition may include any give condition. For example, the signal condition may satisfy one of the conditions that "the level of the transmission signal exceeds the predetermined threshold" and "the frequency of the transmission signal is within the predetermined range."

In the above embodiment, the members to attenuate signals are, but not limited to, the attenuators. Examples of the members may include: high-pass filters, low-pass filters, band-pass filters, or band-stop filters. Any of these filters may be adopted, depending on a frequency band to be used for transmission of the transmission signal.

In a hardware configuration of the wireless communications apparatus 1, the first controller 112 and the second controller 122 may be a single hardware item or may be separate hardware items.

Software Implementation

The control blocks of the wireless communications device 1 (in particular, the first controller 112 and the second controller 122) may be implemented by logic circuits (hardware) fabricated, for example, in the form of an integrated circuit (IC chip) and may be implemented by software.

In the latter form of implementation, the wireless communications apparatus 1 includes a computer that executes instructions from programs or software by which various functions are implemented. This computer includes, for example, at least one processor (a control unit), and at least one computer-readable storage medium containing the above programs. In the computer, the processor retrieves and runs the programs contained in the storage medium, thereby achieving the object of an aspect of the present invention. The processor may include, for example, a central processing unit (CPU). The storage medium may be a "non-transitory, tangible medium" such as a tape, a disc/disk, a card, a semiconductor memory, or programmable logic circuitry, other than, for example, a read-only memory (ROM). The wireless communications apparatus 1 may further include a random access memory (RAM) into which the programs are loaded. The programs may be supplied to the computer via any given transmission medium (e.g., over a communications network or by broadcasting waves) that can transmit the programs. The present invention, in an aspect thereof, encompasses data signals on a carrier wave that are generated during electronic transmission of the programs.

SUMMARY

A wireless communications apparatus (the wireless communications apparatus 1) according to a first aspect of the present invention includes a plurality of wireless circuits (the 5G circuit 11 and the wireless LAN circuit 12) to transmit and receive signals. At least one of the wireless circuits is a first circuit (the 5G circuit 11) for a fifth-generation mobile communications system. At least one of the wireless circuits that is different from the first circuit is a second circuit (the wireless LAN circuit 12) that is likely to be influenced by a transmission signal to be transmitted from the first circuit. The second circuit includes an attenuator (a second attenuator 121) attenuating a reception signal received by the second circuit. The wireless communications apparatus includes a controller (a first controller 112) (i) executing attenuation control to direct the transmission signal to pass through the attenuator if a predetermined signal condition is satisfied, and (ii) keeping from executing the attenuation control if the predetermined signal condition is not satisfied, the predetermined signal condition being satisfied if the second circuit is highly likely to be influenced by the transmission signal received as the reception signal.

Thanks to the above features, if the signal condition is satisfied, the attenuation control is executed to direct the reception signal, received by the second circuit, to pass through the attenuator in the second circuit. Hence, the features can reduce the risk that the second circuit is influenced by the transmission signal transmitted from the first circuit. If the signal condition is not satisfied, the attenuation control is not executed. Hence, the above features make it possible to minimize influence on reception characteristics of the second circuit. As a result, in the wireless communications apparatus including the 5G wireless circuit and a wireless circuit other than the 5G wireless circuit, the wireless circuit other than the 5G wireless circuit can be protected, minimizing influence on reception characteristics of the wireless circuit other than the 5G wireless circuit.

In the wireless communications apparatus, of a second aspect of the present invention, according to the first aspect, the predetermined signal condition may include at least one of: a first condition in which a level of the transmission signal exceeds a predetermined threshold, and a second condition in which a frequency of the transmission signal is within a predetermined range.

Thanks to the above feature, the signal condition is determined in accordance with the level and the frequency of the transmission signal. Hence, if the second circuit is likely to be influenced by the transmission signal from the first circuit, the feature makes it possible to appropriately attenuate the transmission signal.

In the wireless communications apparatus, of a third aspect of the present invention, according to the second aspect, the signal condition may include both the first condition and the second condition. The controller may: identify the level of the transmission signal and a frequency band to be used for transmitting the transmission signal; determine whether the frequency band and a predetermined operation frequency band at least partially overlap each other, the predetermined operation frequency band being a frequency band at which a receiver circuit included in the second circuit operates; and determine whether a value based on (i) the transmission level and (ii) a degree of coupling exceeds a level of the reception signal previously set as the threshold and not influencing the receiver circuit, the degree of coupling being observed between an antenna of the first circuit and an antenna of the second circuit in the predetermined operation frequency band.

The above features make it possible to precisely identify a situation in which the transmission signal transmitted by the first circuit is highly likely to influence the second circuit. As a result, the features make it possible to appropriately attenuate the transmission signal received by the second circuit. The reception signal is not attenuated unless the above situation arises. Hence, the features make it possible to minimize influence on reception characteristics of the second circuit.

In the wireless communications apparatus, of a fourth aspect of the present invention, according to any one of the first to third aspects, the second circuit may include a switch (the second DPDT switch 123), an antenna (the second antenna 124), and a receiver (the second transceiver 125). The controller may: cause the switch to connect the antenna and the receiver together through the attenuator if the signal condition is satisfied; and cause the switch to connect the antenna and the receiver together without the attenuator if the signal condition is not satisfied.

Thanks to the features, the controller controls the switch in accordance with a signal condition, and controls whether the received transmission signal passes through the attenuator. Such features make it possible to protect the second circuit while minimizing influence on the reception characteristics of the second circuit. Note that the statement "to connect the antenna and the receiver together through the attenuator" includes a configuration in which another member is disposed between the antenna and the attenuator. Similarly, the statement includes a configuration in which another member is disposed between the attenuator and the receiver.

In the wireless communications apparatus, of a fifth aspect of the present invention, according to the fourth embodiment, the switch may be a double-pole-double-throw switch.

Thanks to the above features, the DPDT switch adopted to the second circuit can simplify the circuit. As a result, on the circuit, the footprint can be reduced and the wiring layout can be simplified.

In the wireless communications apparatus, of a sixth aspect of the present invention, according to any one of the first to fifth aspects, the first circuit may be likely to be influenced by a second transmission signal to be transmitted from the second circuit. The first circuit may include a second attenuator configured to attenuate a second reception signal received by the first circuit. The wireless communications apparatus may comprise a second controller (i) executing second attenuation control to direct the second transmission signal to pass through the second attenuator if a predetermined second signal condition is satisfied, and (ii) keeping from executing the second attenuation control if the predetermined second signal condition is not satisfied, the predetermined second signal condition being satisfied if the first circuit is highly likely to be influenced by the second transmission signal received as the second reception signal.

Thanks to the above features, if the second signal condition is satisfied, the second attenuation control is executed to direct the reception signal, received by the first circuit, to pass through the second attenuator in the first circuit. Hence, the features can reduce the risk that the first circuit is influenced by the transmission signal transmitted from the second circuit. If the second signal condition is not satisfied, the second attenuation control is not executed. Hence, the features make it possible to minimize influence on reception characteristics of the first circuit. As a result, in the wireless communications apparatus including the 5G wireless circuit and a wireless circuit other than the 5G wireless circuit, the 5G wireless circuit can be protected, minimizing influence on reception characteristics of the 5G wireless circuit.

In the wireless communications apparatus, of a seventh aspect of the present invention, according to any one of the first to sixth aspects, the second circuit may be a wireless circuit for a wireless local area network (LAN) system using a frequency band including a 5 GHz band.

Thanks to the above feature, the second circuit is a wireless circuit for a wireless LAN system using a frequency band including a 5 GHz band. Hence, the frequency band for the second circuit is close to a frequency band (in particular, the sub-6 GHz band) for the first circuit. That is, the first circuit and the second circuit are likely to be influenced by the transmission signals from each other. In such a feature, the reception signal observed when the signal condition is satisfied passes through the attenuator. Hence, in the combination of the wireless circuits susceptible to the transmission signals from each other, the feature makes it possible to protect the wireless circuits. Note that the "5 GHz band" specifically ranges from 5.150 to 5.725 GHz.

In the wireless communications apparatus, of an eighth aspect of the present invention, according to the seventh aspect, the first circuit may transmit and receive the signals, using a frequency band including a 4.5 GHz band.

Thanks to the above feature, the frequency band for the first circuit includes a 4.5 GHz included in the frequency bands available and closest to the frequency band for the second circuit. Specifically, the combination of the wireless circuits in the feature; namely, the first circuit and the second circuit, is most susceptible to the transmission signals transmitted from each other. In such a feature, the reception signal observed when the signal condition is satisfied passes through the attenuator. Hence, in the combination of the wireless circuits susceptible to the transmission signals from each other, the feature makes it possible to protect the wireless circuits.

A wireless communications apparatus (the wireless communications apparatus 1) according to a ninth aspect of the present invention includes a plurality of wireless circuits (the 5G circuit 11 and the wireless LAN circuit 12) to transmit and receive signals. At least one of the wireless circuits is a first circuit (the 5G circuit 11) for a fifth-generation mobile communications system. At least one of the wireless circuits that is different from the first circuit is a second circuit (the wireless LAN circuit 12) transmitting a transmission signal that is likely influence the first circuit. The first circuit includes an attenuator (a first attenuator 111)

attenuating a reception signal received by the first circuit. The wireless communications apparatus includes a controller (a second controller 122) (i) executing attenuation control to direct the transmission signal to pass through the attenuator if a predetermined signal condition is satisfied, and (ii) keeping from executing the attenuation control if the predetermined signal condition is not satisfied, the predetermined signal condition being satisfied if the first circuit is highly likely to be influenced by the transmission signal received as the reception signal.

Thanks to the above features, if the signal condition is satisfied, the attenuation control is executed to direct the reception signal, received by the first circuit, to pass through the attenuator in the first circuit. Hence, the features can reduce the risk that the first circuit is influenced by the transmission signal transmitted from the second circuit. If the signal condition is not satisfied, the attenuation control is not executed. Hence, the features make it possible to minimize influence on reception characteristics of the first circuit. As a result, in the wireless communications apparatus including the 5G wireless circuit and a wireless circuit other than the 5G wireless circuit, the 5G wireless circuit can be protected, minimizing influence on reception characteristics of the 5G wireless circuit.

A method according to a tenth aspect of the present invention is for controlling a wireless communications apparatus (the wireless communications apparatus 1) including a plurality of wireless circuits transmitting and receiving signals. At least one of the wireless circuits is a first circuit for a fifth-generation mobile communications system. At least one of the wireless circuits that is different from the first circuit is a second circuit that is likely to be influenced by a transmission signal to be transmitted from the first circuit. The second circuit includes an attenuator attenuating a reception signal received by the second circuit. The method includes: determining (Step S2) whether a predetermined signal condition is satisfied, the predetermined signal condition being satisfied if the second circuit is highly likely to be influenced by the transmission signal received as the reception signal; and executing attenuation control (Step S3) to direct the transmission signal to pass through the attenuator if the predetermined signal condition is satisfied. The attenuation control is not executed if the determining indicates that the predetermined signal condition is not satisfied.

The above features achieve advantageous effects similar to those of the first aspect.

A method according to an eleventh aspect of the present invention is for controlling a wireless communications apparatus (the wireless communications apparatus 1) including a plurality of wireless circuits transmitting and receiving signals. At least one of the wireless circuits is a first circuit for a fifth-generation mobile communications system. At least one of the wireless circuits that is different from the first circuit is a second circuit transmitting a transmission signal that is likely to influence the first circuit. The first circuit includes an attenuator attenuating a reception signal received by the first circuit. The method includes: determining (Step S2') whether a predetermined signal condition is satisfied, the predetermined signal condition being satisfied if the first circuit is highly likely to be influenced by the transmission signal received as the reception signal; and executing attenuation control (Step S3') to direct the transmission signal to pass through the attenuator if the predetermined signal condition is satisfied. The attenuation control is not executed if the determining indicates that the predetermined signal condition is not satisfied.

The above features achieve advantageous effects similar to those of the ninth aspect.

An electronic device (the smartphone 100) according to a twelfth aspect of the present invention includes the wireless communications apparatus according to any one of the first to ninth aspects.

The above features achieve advantageous effects similar to those of any one of the first to ninth aspects.

The present invention shall not be limited to the embodiments described above, and can be modified in various manners within the scope of claims. The technical aspects disclosed in different embodiments are to be appropriately combined together to implement another embodiment. Such an embodiment shall be included within the technical scope of an aspect of the present invention. Moreover, the technical aspects disclosed in each embodiment may be combined to achieve a new technical feature.

What is claimed is:

1. A wireless communications apparatus, comprising
a plurality of wireless circuits configured to transmit and receive signals,
at least one of the wireless circuits being a first circuit for a fifth-generation mobile communications system,
at least one of the wireless circuits that is different from the first circuit being a second circuit that is likely to be influenced by a transmission signal to be transmitted from the first circuit,
the second circuit including an attenuator configured to attenuate a reception signal received by the second circuit, and
the wireless communications apparatus comprising a controller configured to (i) execute attenuation control to direct the transmission signal to pass through the attenuator if a predetermined signal condition is satisfied, and (ii) keep from executing the attenuation control if the predetermined signal condition is not satisfied, the predetermined signal condition being satisfied if the second circuit is highly likely to be influenced by the transmission signal received as the reception signal.

2. The wireless communications apparatus according to claim 1, wherein
the predetermined signal condition includes at least one of:
a first condition in which a level of the transmission signal exceeds a predetermined threshold; and
a second condition in which a frequency of the transmission signal is within a predetermined range.

3. The wireless communications apparatus according to claim 2, wherein
the signal condition includes both the first condition and the second condition, and
the controller:
identifies the level of the transmission signal and a frequency band to be used for transmitting the transmission signal,
determines whether the frequency band and a predetermined operation frequency band at least partially overlap each other, the predetermined operation frequency band being a frequency band at which a receiver circuit included in the second circuit operates, and
determines whether a value based on (i) the transmission level and (ii) a degree of coupling exceeds a level of the reception signal previously set as the threshold and not influencing the receiver circuit, the degree of coupling being observed between an antenna of the first circuit and an antenna of the second circuit in the predetermined operation frequency band.

4. The wireless communications apparatus according to claim 1, wherein
the second circuit includes a switch, an antenna, and a receiver, and
the controller:
causes the switch to connect the antenna and the receiver together through the attenuator if the signal condition is satisfied; and
causes the switch to connect the antenna and the receiver together without the attenuator if the signal condition is not satisfied.

5. The wireless communications apparatus according to claim 4, wherein
the switch is a double-pole-double-throw switch.

6. The wireless communications apparatus according to claim 1, wherein
the first circuit is likely to be influenced by a second transmission signal to be transmitted from the second circuit,
the first circuit includes a second attenuator configured to attenuate a second reception signal received by the first circuit, and
the wireless communications apparatus comprises a second controller configured to (i) execute second attenuation control to direct the second transmission signal to pass through the second attenuator if a predetermined second signal condition is satisfied, and (ii) keep from executing the second attenuation control if the predetermined second signal condition is not satisfied, the predetermined second signal condition being satisfied if the first circuit is highly likely to be influenced by the second transmission signal received as the second reception signal.

7. The wireless communications apparatus according to claim 1, wherein
the second circuit is a wireless circuit for a wireless local area network (LAN) system using a frequency band including a 5 GHz band.

8. The wireless communications apparatus according to claim 7, wherein
the first circuit transmits and receives the signals, using a frequency band including a 4.5 GHz band.

9. An electronic device comprising the wireless communications apparatus according to claim 1.

10. A wireless communications apparatus, comprising
a plurality of wireless circuits configured to transmit and receive signals,
at least one of the wireless circuits being a first circuit for a fifth-generation mobile communications system,
at least one of the wireless circuits that is different from the first circuit being a second circuit configured to transmit a transmission signal that is likely to influence the first circuit,
the first circuit including an attenuator configured to attenuate a reception signal received by the first circuit, and
the wireless communications apparatus comprising a controller configured to (i) execute attenuation control to direct the transmission signal to pass through the attenuator if a predetermined signal condition is satisfied, and (ii) keep from executing the attenuation control if the predetermined condition is not satisfied, the predetermined signal condition being satisfied if the first circuit is highly likely to be influenced by the transmission signal received as the reception signal.

* * * * *